United States Patent [19]

Helms

[11] Patent Number: 4,987,972
[45] Date of Patent: Jan. 29, 1991

[54] TREE CLIMBING APPARATUS

[76] Inventor: James K. Helms, 9780 Creekfront Rd., #202, Jacksonville, Fla. 32256

[21] Appl. No.: 349,635

[22] Filed: May 10, 1989

[51] Int. Cl.$^5$ ................................................ E04G 3/00
[52] U.S. Cl. ..................................... 182/187; 182/134
[58] Field of Search .............. 182/187, 188, 152, 133, 182/134, 135, 136; 248/218.4

[56] References Cited

U.S. PATENT DOCUMENTS

| | | | |
|---|---|---|---|
| 3,885,649 | 5/1975 | Damron | 182/187 |
| 3,955,645 | 5/1976 | Dye | 182/187 X |
| 4,168,765 | 9/1979 | Ferguson et al. | 182/187 X |
| 4,369,858 | 1/1983 | Babb | 182/187 X |
| 4,667,773 | 5/1987 | Davis | 182/187 |
| 4,802,552 | 2/1989 | Williams | 182/187 |

Primary Examiner—Karen J. Chotkowski
Attorney, Agent, or Firm—Thomas C. Saitta

[57] ABSTRACT

A climbing tree stand having two separate climbing assemblies, the lower assembly having a collapsible chair such that the leg members of the chair can be positioned flush with the surface of the platform of the lower climbing assembly or set in an upright position. The position of the chair is interchangeable while the tree stand is in place on the tree, and does not obstruct the platform when in the collapsed position. The chair is freely rotatable in any direction. The upper climbing assembly provides a safety harness to prevent the user from accidentally falling.

7 Claims, 3 Drawing Sheets

TREE CLIMBING APPARATUS

BACKGROUND OF THE INVENTION

The invention relates to the field of horizontal support platforms adapted to be positioned on vertical support members, with more particular regard to the field of devices known as tree stands, which are support platforms capable of supporting a human being. A tree stand is adapted to be attachable to or around a tree trunk a distance above the ground and is commonly used in forest settings by hunters or observers as a means of concealment from wildlife. Even more particularly, the invention involves the field of tree stands known as climbing tree stands, whereby the structure of the tree stand is such that the tree stand itself is a means to climb the trunk of the tree to position the stand a distance above the ground.

Tree stands and climbing tree stands are well known in the art. A non-climbing tree stand usually consists of a platform or chair-type assembly adapted to be attached to a tree by screws, spikes or encircling members (e.g., chains or belts), or combinations of like elements. The obvious drawback of this type of tree stand is that the user must either climb the tree by hand or bring a ladder if it is desired to place the stand a significant distance above the ground. Examples of these type of devices can be seen in U.S. Pat. No. 4,236,602 to Leggett, U.S. Pat. No. 4,549,635 to Early, U.S. Pat. No. 4,603,757 to Hollinger, U.S. Pat. No. 4,667,773 to Davis, and U.S. Pat. No. 4,730,699 to Threlkeld.

Climbing tree stands are also well known in the art and usually consist of two separate climbing assemblies. Each assembly is adapted to rigidly encircle the tree trunk, but in such a manner that the assembly can be moved up or down the trunk if the assembly is angled upward, but will firmly grasp the trunk when the assembly is forced in a downward direction. This structure usually takes the form of two curved or V-shaped, rigid grasping members, attached to the assembly such that the open or concave side of each grasping member faces that of the other grasping member, with the tree trunk occupying the space between the two grasping members. The grasping members are not in parallel planes, with one grasping member usually being in the same plane as the horizontal support platform while the other is angled a certain number of degrees off this plane. Examples of climbing tree stands are seen in U.S. Pat. No. 4,331,216 to Amacker, U.S. Pat. No. 4,488,620 to Gibson, U.S. Pat. No. 4,452,338 to Untz, U.S. Pat. No. 4,549,633 to Merritt, and U.S. Pat. No. 4,726,447 to Gibson et al.

The operation of climbing the tree is performed by enclosing the tree trunk between the grasping members of each of the climbing assemblies. The user then stands on the lower assembly and angles the upper assembly to allow free movement of the upper assembly on the trunk. Raising the upper assembly, the user then shifts his weight to the upper assembly, which locks it onto the tree trunk and allows him to free the lower assembly and raise it on the trunk. He then shifts his weight back to the lower assembly, locking it onto the tree trunk, and then begins a new cycle by unlocking and raising the upper assembly again. These steps are repeated until the stand is at the desired height from the ground. To descend the tree, the steps are simply performed in the same cycle, but the assemblies are lowered instead of raised each time.

Because a hunter or observer does not know from which direction or at what distance the animal will appear, it is advantageous to have as much room and as much range of motion as possible on the tree stand. Ideally, the stand should allow the user to position himself facing any given direction. Furthermore, the user will usually occupy the tree stand for long periods of time, often hours, and it is therefore advantageous to have a stand which allows for changes in position. Either for comfort or to enhance line of sight, an ideal tree stand would allow the occupant to stand, squat or sit as he desires. Lastly, a tree stand should have safety mechanisms to insure that the user will not accidentally fall from the stand.

It is an object of this invention to provide a tree stand which is used to climb the tree and is structured such that the user can choose between a flat, unobstructed platform or a platform with a chair.

It is a further object of this invention to provide a climbing tree stand whereby the user can choose between a flat platform or on with a chair while the stand is in position above the ground.

It is a further object of this invention to provide a climbing tree stand whereby the user can alternate between a flat platform and a chair while the stand is in position above the ground.

It is a further object of this invention to provide a climbing tree stand where the chair is collapsible to the level of the platform.

It is a further object of this invention to provide a climbing tree stand having a chair free to rotate in any direction.

It is a further object of this invention to provide a climbing tree stand of two assemblies, where the upper assembly acts as a safety mechanism to prevent the user from falling off the tree stand.

BRIEF SUMMARY OF THE INVENTION

The invention comprises a climbing tree stand having two main climbing assemblies. The lower climbing assembly comprises a platform capable of supporting the weight of a human while affixed to a tree trunk. Two rigid gripping members having concave or V-shaped form oppose each other in a non-planar relationship, the outer gripping member being detachable from the platform so that it can be fastened around the tree to be climbed. A collapsible chair is attached to the platform such that the chair can be folded out of the way and the platform is not obstructed. Likewise, the chair can be re-positioned when the user desires to use it again. These operations can be performed while the tree stand is in use affixed to the tree. The support members of the collapsible chair fit into a recess in the platform when the chair is collapsed, while the seat itself is positioned beyond the edge of the platform. The seat is further structured such that it can be completely rotated. The bracing elements for the platform are preferably situated below the level of the platform to preclude them from being obstructions to the user.

The upper climbing assembly also comprises two gripping members of the same type as the lower climbing assembly. This assembly has no platform, but is open in construction such that the user can place his body within the periphery of the frame to sit on the far end while raising the lower climbing assembly during the climbing process. When sufficient height has been reached, the upper assembly is affixed to the trunk a distance above the user's head so it does not obstruct the user when standing. A safety mechanism, such as a strap or harness adapted to encircle the user's body, is attached to the upper climbing assembly.

DETAILED DESCRIPTION OF THE INVENTION

Figure 1:
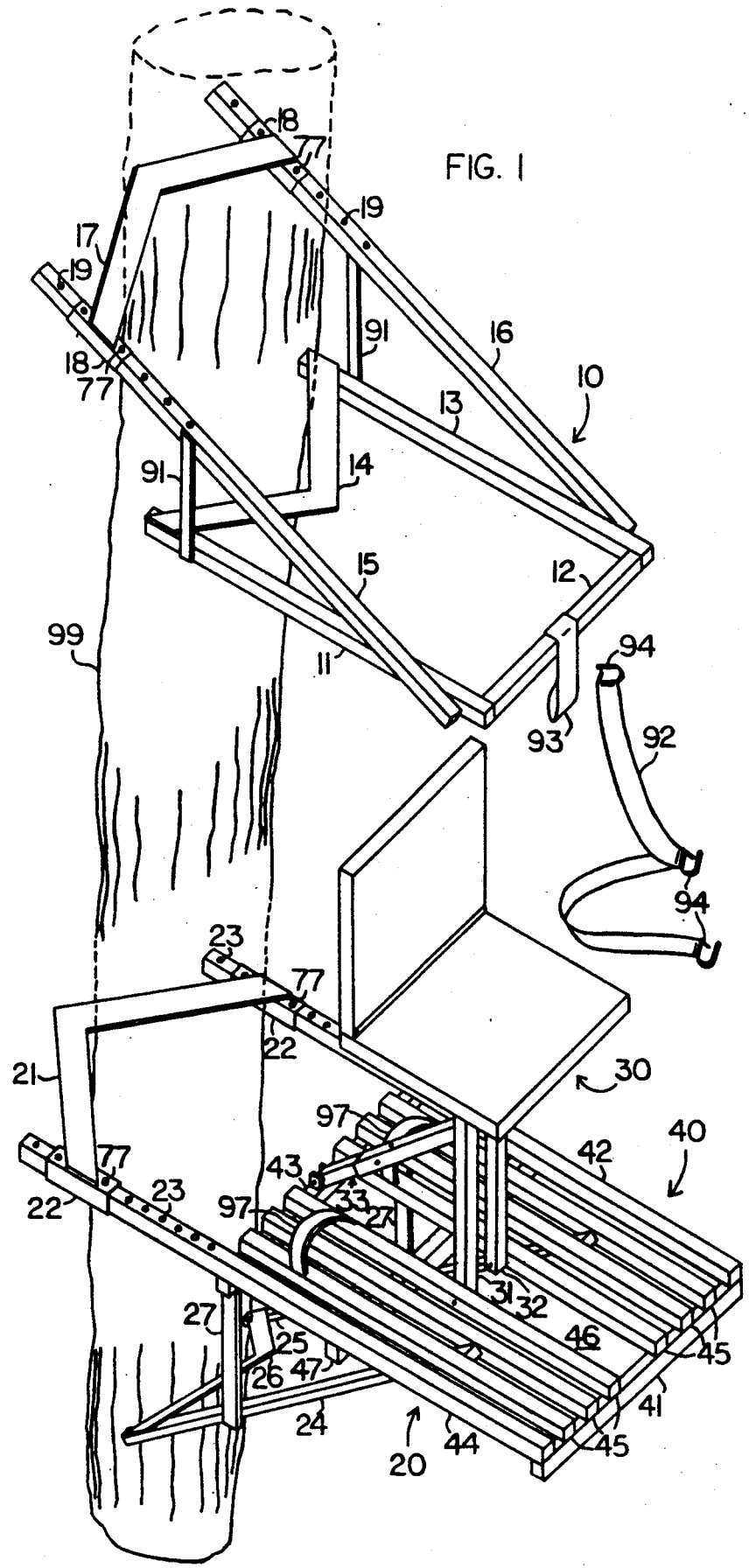
FIG. 1 is a perspective view of the invention, shown as positioned in use on a tree.

Referring now to FIG. 1, an overall perspective of the invention is shown. The device comprises two main climbing assemblies, the upper climbing assembly 10 and the lower climbing assembly 20. The device is shown as it would be seen affixed to tree 99 in position for use a distance above ground level. Upper assembly 10 comprises frame members 11, 12 and 13 which form a generally rectangular construction in conjunction with lower tree gripping member 14. Frame members 11, 12 and 13 and lower gripping member 14 have an unobstructed interior portion and are rigidly attached using bolts, welds or similar means which will produce a solid, fixed construction. Lower gripping member 14 has a V-shaped or curved form with the open or concave side facing away from the frame members. Gripping member 14 is preferably constructed of flat aluminum or other strong, lightweight metal so that the it is thin and blade-like in cross-section and will be compressed into the bark of the tree when a downward force is applied to upper climbing assembly 10.

Attached by bolts or welds near the joints of frame members 11, 12 and 12, 13 are angled braces 15 and 16. Angled braces 15, 16 are longer than frame members 11, 12 and in use extend to the far side of tree 99. Detachably affixed to the far ends of angled braces 15, 16 is upper gripping member 17. Upper gripping member 17 is V-shaped or curved, with the concave side facing tree 99, and is thin and blade-like in cross-section. Upper gripping member 17 is preferably constructed of the same material as lower gripping member 14. Attached to each end of upper gripping member 17 are guide tubes 18. Guide tubes 18 are short segments having an inner shape and size suitable to contain angled braces 15, 16, such that upper gripping member 17 can be slidingly positioned along angled braces 15, 16 at the required distance to fit around tree 99. Furthermore, upper gripping member 17 can be completely removed from angled braces 15, 16. To affix upper climbing assembly 10 to the tree 99, upper gripping member 17 is removed, upper climbing assembly 10 is placed next to tree 99 with lower gripping member 14 adjacent the trunk, then upper gripping member 17 is replaced onto angled braces 15, 16 by sliding guide tubes 18 on. The upper gripping member 17 is then locked in place by inserting quick-release detent pins 77 or similar fasteners through apertures 19 in guide tubes 18 and angled braces 15, 16. In this manner, tree 99 will be situated between upper gripping member 17 and lower gripping member 14, with frame elements 11, 12 and 13 extending roughly horizontally from the side of tree 99. Vertical braces 91 are attached between angled braces 15, 16 and frame members 11, 13 to provide additional structural support.

Attached near the center of frame member 12 is safety harness 92. Safety harness 92 preferably comprises a two-segment strap of any strong flexible material, such as fabric webbing, the two segments being adjustable in length. One end of each segment is joined to a common safety hook 94, and each free end has a safety hook 94 attached. The safety hook 94 of one end of safety harness 92 may be attached to an eye-bolt or hook extending from frame member 12, but is preferably attached to a flexible strap 93 having a loop on the end which extends from frame member 12. This allows greater freedom of movement for the user. The portion of safety harness 92 consisting of the unattached safety hook 94 and strap segment is placed around the user's torso the safety hook 94 is attached to the common safety hook 94 to form a belt. The safety harness 92 is of sufficient strength to prevent the user from falling to the ground.

Lower climbing assembly 20 is comprised of two main components, collapsible seating assembly 30 and platform 40. Platform 40 is comprised of support members 41, 42, 43 and 44 which are rigidly attached to form a rectangular shape, with the ends of the two long support members 42, 44 extending beyond support member 43. The support members 41, 42, 43, 44 are joined by bolts, welds or other suitable means. Detachably attached to each support member 42, 44 is platform upper gripping member 21. Platform upper gripping member 21 is similar to upper gripping member 17 of the upper climbing assembly 10 and is V-shaped or curved with the concave or open side facing towards tree 99 and platform 40. Platform upper gripping member 21 is preferably made of flat aluminum or similar lightweight metal. It is attached to support members 42, 44 by guide tubes 22, which are affixed to each end of the platform upper gripping member 21, and which allow for removal of platform upper gripping member 21 for placement around the trunk of tree 99 in the same manner as upper gripping member 17, previously described. Detent pins 77 or similar fastening means are inserted through apertures 23 to lock platform upper gripping member 21 in place.

Support angled braces 24, 25 are attached to platform 40 at a position near the far end of platform 40 away from tree 99. Platform lower gripping member 26 is attached to the other ends of support angled braces 24, 25 and is V-shaped or curved similar to lower gripping member 14 of upper climbing assembly 10. The open or concave side of support gripping member 26 faces away from platform 40 and toward tree 99. Vertical braces 27 are attached between support angled braces 24, 25 and support members 42, 44 to increase stability and strength. Platform 40 is constructed to allow for the user to be able to stand upright. Platform 40 can be constructed of a number of horizontal support elements 45. Alternatively, platform 40 can also be constructed of expanded metal, heavy gauge intersecting wire, wood or any other suitable material capable of holding the weight of a person. Horizontal support elements 40 must be positioned such that a central gap or channel 46 is situated parallel to support members 42, 44. This channel 46 is of sufficient width to allow the legs 31, 32 and telescoping brace 33 of collapsing seat assembly 30 to fit flush with the upper surface of platform 40 when the seat assembly 30 is collapsed. A cross brace 47 extends from support member 42 to support member 44 to provide further rigidity and support to platform 40.

Figure 2:
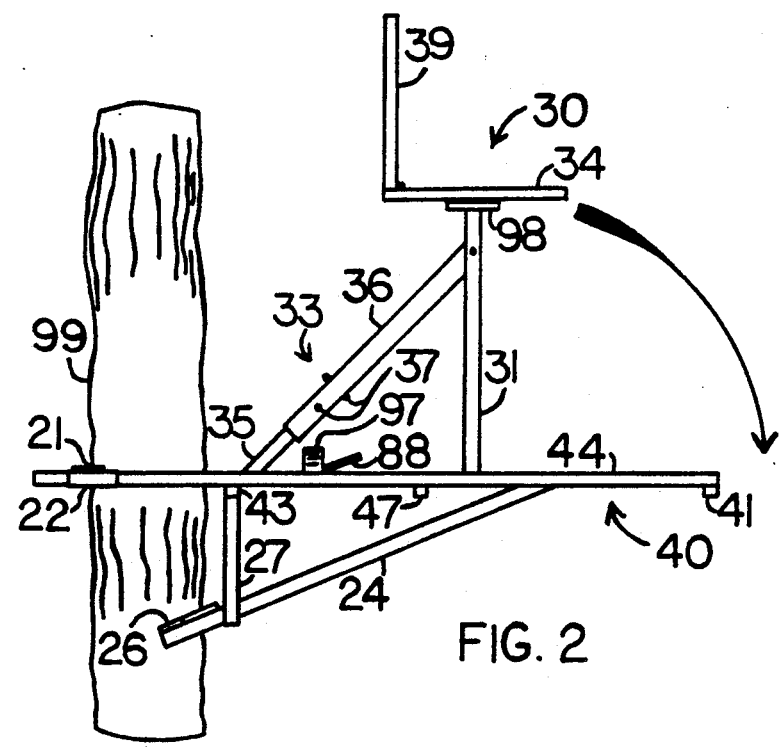
FIG. 2 is a side view of the platform of the invention showing the seating assembly.

Referring now also to FIG. 2, the collapsing seat assembly 30 and its relation to platform 40 are illustrated. Legs 31, 32 are each pivotally attached at the base to the interior horizontal support elements 45 such that the legs can be lowered from a vertical position to a horizontal position by swinging the seat assembly 30 to the front of the platform 40, away from tree 99. Legs 31, 32 rest on support member 41 when in the lowered or collapsed position, such that the upper surfaces of legs 31, 32 are even with the surface of platform 40. The length of legs 31, 32 are such that seat bottom 34 will be positioned beyond the end of platform 40 when in the collapsed condition.

Figure 3:
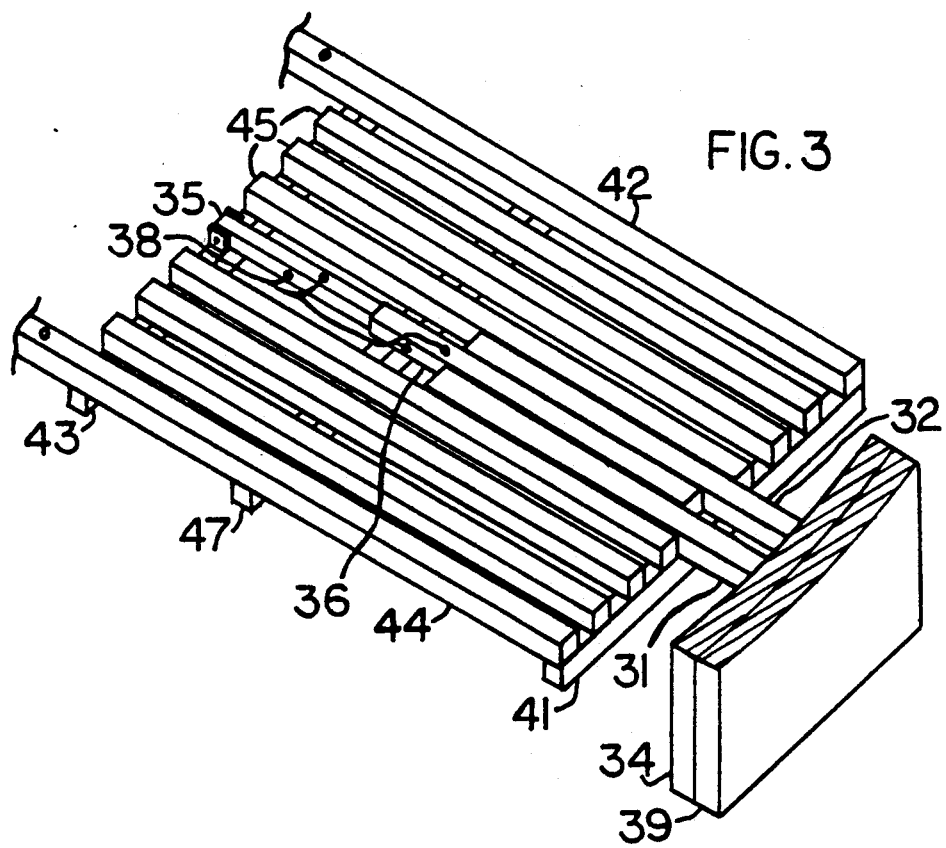
FIG. 3 is a perspective view of a portion of the platform with the seating assembly in the fully collapsed position, with a portion of the seating removed for clarity.

Telescoping brace 33 is the mechanism which locks seat assembly 30 in the vertical position as well as allowing it to be lowered flush with the surface platform 40. Telescoping brace 33 is comprised of two separable members, inner post 35 and outer post 36. Inner post 35 is pivotally attached to support member 43 such that it can be angled upward or dropped to a horizontal position flush with the surface of platform 40. With seat assembly 30 in the vertical position, inner post 35 will extend into outer post 36 a sufficient distance to insure that telescoping brace 33 is rigid and non-flexing. Detent pins 37 are positioned near the end of inner post 35 so that when inner post 35 is inserted the proper distance inside outer post 36 for the legs 31, 32 to be vertical, detent pins 37 can be placed through apertures 38 in outer post 36 and inner post 35, thereby locking the two components of the telescoping brace 33 in place. To unlock and lower the seat assembly 30, the user removes detent pins 37 and pushes seat assembly 30 towards support member 41, away from tree 99. This causes inner post 35 to slide within outer post 36, such that telescoping brace 33 lengthens. As previously described, all components of telescoping brace 33 and legs 31, 32 will be flush with the surface of platform 40 when seat assembly 30 is fully lowered, as seen in FIG. 3. To raise the seat assembly 30 from the horizontal position, the user simply swings it back up to vertical position and inserts detent pins 37 through apertures 38 to lock the seat assembly 30 in place.

Preferably, seat bottom 34 is attached to a rotating assembly 9 which allows 360 degree rotation of seat bottom 34, with legs 31, 32 being attached to the rotating assembly 98. Furthermore, seat back 39 is pivotally attached to seat bottom 34 so that it ca be folded flat for use as a stool and also to provide a more compact assembly when in the horizontal position or when being transported. Additionally, seat bottom 34 and rotating assembly 98 can be pivotally attached to legs 31, 32 so that the seat bottom 34 and folded seat back 39 can be positioned parallel to platform 40 during transport. A detent pin is used to lock the seat bottom 34 in perpendicular relation to legs 31, 32 during use on the tree 99.

Foot straps 97, made of a flexible material such as fabric webbing or leather, are attached to the surface of platform 40 near support member 43. The positioning of foot straps 97 is determined by the balance point of lower climbing assembly 20. Heel straps 88, made of an elastic material, extend from the base of each foot strap 97 and act to maintain the user's foot in the foot strap 97 when climbing. To climb tree 99, the user first attaches lower climbing assembly 20 to tree 99 as previously described by detaching and reattaching support upper gripping member 21 around tree 99. The user then attaches upper climbing assembly 10 to tree 99 several feet above lower climbing member 20 by detaching and reattaching upper gripping member 17. The user then stands on lower climbing assembly 20, inserting his body through the opening of upper climbing assembly 10. Securing foot straps 97 and heel straps 88 to his feet, the user sits on frame member 12 and uses his feet to angle lower climbing assembly 20. This causes the two gripping members 21 and 26 to release the tree 99 and the lower climbing assembly 20 is raised as far upwards as possible. Pushing down on the lower climbing assembly 20 will now lock it onto tree 99. The user then stands on lower climbing assembly 20 and uses his hands to angle upward upper climbing assembly 10. This releases it from tree 99 and the user raises upper climbing assembly 10 the appropriate distance to repeat the cycle. Upon the lower climbing assembly 20 attaining the desired height, the upper climbing assembly 10 is positioned above the head of the user for use as a safety device to prevent accidental falling. To descend the tree 99, the cycle is reversed.

The invention is designed such that it is easily transportable. Strong, lightweight materials, such as aluminum, are used for the major structural members. The structure as described also allows upper climbing assembly 10 and lower climbing assembly 20 to be tightly nested when not in use. The exterior distance between support angled braces 24 and 25 of the lower climbing assembly 20 is slightly less than the interior distance between angled braces 15 and 16 of the upper climbing assembly 10. Thus lower climbing assembly 20 ca be nested within upper climbing assembly 10, such that angled braces 15 and 16 are adjacent support members 4 and 42, respectively.

Seat assembly 30 is positioned for transport by detaching telescoping brace 33 from support member 43. Seat back 39 is folded against seat bottom 34, which is in turn folded parallel to legs 31, 32. Seat assembly 30 is collapsed in the direction of support member 43 and the entire seat assembly 30 is now parallel and adjacent to platform 40. Safety harness 92 is removed from frame member 12 and hooked at three points on platform 40 to create carrying straps similar to those of a backpack. The entire invention is now readily transported on the user's back.

Figure 4:
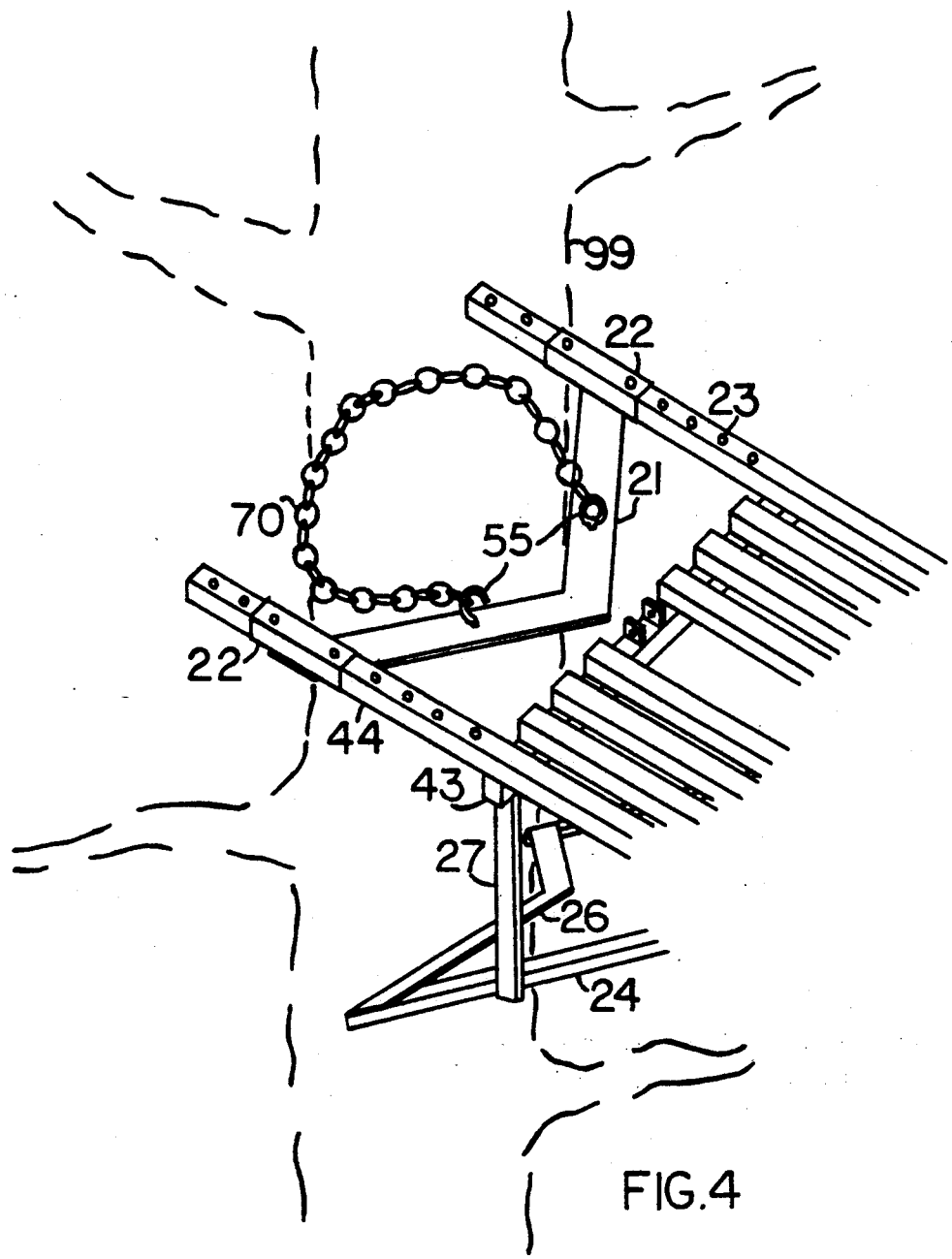
FIG. 4 is a view of an alternate embodiment of the invention, showing the use of a chain as means to maintain the platform on the tree.

For situations where the available trees are not suitable for climbing with the invention as previously described due to the presence of branches, the device is adaptable to allow attachment to a tree by chain or strap, a method known in the art. The user climbs the tree using the branches or a ladder, carrying the lower climbing assembly 20 on his back. As seen in FIG. 4, platform upper gripping member 21 is completely removed, reversed and repositioned on support members 42, 44. Platform upper gripping member 21 is locked onto support members 42, 44 in a position adjacent to support member 43, such that the concave side of platform upper gripping member now faces in the same direction as the concave side of platform lower gripping member 26. Platform 40 will be level when the concave sides of gripping members 21 and 26 are placed nest to the trunk of tree 99. Two fastening members 55, consisting of eyebolts or hooks, are affixed to platform upper gripping member 21. The user positions the lower climbing assembly 20 in place, attaches chain 70 to on fastening member 55, encircles the chain 70 around tree 99 and secures its other end to the other fastening member 55. Alternatively, chain 70 can be permanently attached to one of fastening members 55. If desired, upper climbing assembly 10 can also be positioned in the same manner for use as a safety means.

It is to be understood that the above descriptions are by way of illustration only, and that one skilled in the art could adapt by use of equivalents or substitution. The true definition and scope of the invention is, therefore, as set forth in the following claims.

I claim:

1. An apparatus for climbing a tree or like vertical structure and providing an horizontal platform capable of supporting a human, comprising two separate climbing assemblies, an upper climbing assembly and a lower climbing assembly, used in conjunction to perform the tree climbing operation;

said upper climbing assembly comprising two opposed gripping members in non-planar relationship, adapted to engage said tree between said gripping members; and further comprising a substantially rectangular frame having an unobstructed interior portion;

said lower climbing assembly comprising two opposed gripping members in non-planar relationship, adapted to engage said tree between said gripping members; further comprising a collapsible seating assembly having pivoting leg members and a seat rotatably attached to said leg members, where said seating assembly can be maintained in either an upright or collapsed position; and further comprising a substantially planar platform, said platform having a gap adapted to receive said leg members when said seating assembly is collapsed, whereby the upper surface of said leg members and said platform are even and no portion of said seating assembly obstructs any portion of said platform;

where said seating assembly is set in the collapsed position during the climbing operation, and can be interchangeably set in either the upright or collapsed position when said apparatus is in use as an horizontal platform.

2. The apparatus of claim 1, where the collapsible seating assembly of said lower climbing assembly further comprises a telescoping brace member having an inner post and an outer post, where said inner post slides within said outer post to lengthen or shorten said telescoping brace member.

3. The apparatus of claim 2, where the telescoping brace member has apertures to receive a detent pin, whereby the telescoping brace member can be locked in one position.

4. The apparatus of claim 1, where the upper climbing assembly further comprises a detachable safety harness.

5. The apparatus of claim 1, where one of the opposed gripping members of the upper climbing assembly and one of the gripping members of the lower climbing assembly are removable.

6. The apparatus of claim 5, where the removable gripping members have fastening members adapted for attachment of a chain.

7. The apparatus of claim 1, where the opposed gripping members of the upper climbing assembly are substantially even with or above the frame, and where the opposed gripping members of the lower gripping assembly are substantially even with or below the platform.

* * * * *